United States Patent [19]

Ballesteros

[11] Patent Number: 5,263,298
[45] Date of Patent: Nov. 23, 1993

[54] PROCEDURE FOR MAKING IN-SITU MANHOLES FOR UNDERGROUND ELECTRIC AND TELEPHONE LINES DUCTWORK

[76] Inventor: Angel G. Ballesteros, Espuela 1, 29016 Malaga, Spain

[21] Appl. No.: 919,923

[22] Filed: Jul. 27, 1992

Related U.S. Application Data

[63] Continuation of Ser. No. 641,011, Jan. 14, 1991, abandoned.

[30] Foreign Application Priority Data

Jan. 15, 1990 [ES] Spain ............... 9000088

[51] Int. Cl.⁵ ............................................. E02D 29/12
[52] U.S. Cl. ............................................. 52/742; 52/20; 52/100; 52/169.6; 52/169.7; 52/745.02; 174/37
[58] Field of Search ............. 52/19, 20, 21, 169.6, 52/169.7, 742 I, 743, 98, 100, 609, 610, 611; 174/37, 39

[56] References Cited

U.S. PATENT DOCUMENTS

| | | | |
|---|---|---|---|
| 951,192 | 3/1910 | Massey | 52/169 R |
| 3,385,012 | 5/1968 | Lovegreen | 52/100 |
| 3,543,457 | 12/1970 | Budlong | 52/100 |
| 3,672,103 | 6/1972 | Kost | 52/20 |
| 3,745,738 | 7/1973 | Singer | 52/741 |
| 3,938,285 | 2/1976 | Gilbu | 52/20 |
| 3,974,599 | 8/1976 | Grosh | 52/20 |
| 4,089,139 | 5/1978 | Moffa et al. | 52/20 |

*Primary Examiner*—Carl D. Friedman
*Assistant Examiner*—Robert Canfield
*Attorney, Agent, or Firm*—Ladas & Parry

[57] ABSTRACT

Procedure for making in-situ underground manholes intended for the passage of electric and telephone ducts which are dimensioned so as to permit the operator's work inside for carrying out repairs, mounting, maintenance, etc. of electric and/or telephone networks. The procedure is based on obtaining a module made of a tough, nonconducting rust-proof light-weight material which is laid in the corresponding hole on the ground and then it is externally filled up with concrete to complete the manhole construction. The inner mould or module is made by joining together two identical square cross-section pieces with a longitudinal profile which will determine the manhole opening in this joining together of both pieces.

20 Claims, 2 Drawing Sheets

PROCEDURE FOR MAKING IN-SITU MANHOLES FOR UNDERGROUND ELECTRIC AND TELEPHONE LINES DUCTWORK

This is a continuation of co-pending application Ser. No. 07/641,011 filed Jan. 14, 1991 now abandoned.

The invention refers to a procedure for making in-situ underground manholes intended for use in ductwork for electric and telephone lines allowing for the performance of mounting and maintenance work in such manholes by the relevant personnel.

The procedure in question is based on laying a mould with the shape of the manhole to be carried out. Such mould is made of a light-weight PVC or PRC (glass-fibre reinforced polyester resin compound) material with the appropriate strength and it is laid in the ditch or shaft along which the ductwork will run and then covered with H-100 type light-weight concrete or compacted earth, while the internal finish of such manhole is provided for by the non-recoverable mould or formwork itself mentioned above.

At present, 95% of manholes carried out are being made by using the traditional brickwork system, while the remaining 5% are made of precast concrete. In the first case, the following procedure is used:

1. Opening of the shaft in the street making sure that the shaft is aligned with the ditches opened for laying the ducts.
2. Construction of a 1-foot or ½-foot (304.8 or 152.4 mm) brickwork wall ending in a dome-shaped top.
3. Laying of a cover supporting frame made of 60×60 mm or 80×80 mm L-shape metal profiles. This frame will house the corresponding cover.
4. Filling of the gap left between the shaft excavation and the manhole with compacted earth or concrete.

The inconveniences posed by the execution of the type of manhole described above may be summarized as follows:

a. The execution times for a manhole are long. Two men, i.e. a skilled labourer and an unskilled labourer, both well-qualified, are required. Time required for the execution of one unit is 7 hours.

b. Dependence on materials such as bricks, mortar, water, etc. and tools required for the execution at the excavation site.

c. High cost of execution. The cost prices for carrying out a manhole of this type are higher than thirty thousand pesetas.

d. Permeability of the manhole walls. The carrying out of manholes using brickwork and concrete and the difficulty and high cost involved in making them watertight makes possible the entry of underground water and moisture into the manholes.

e. The manhole walls are made of electric current conducting materials (bricks, concrete) and so earth leakage through them is possible thus posing a potential hazard for maintenance personnel.

f. In time, the cover supporting metal profile will undergo a degradation caused by rusting.

When manholes are made of precast concrete, then the use of brickwork is avoided but again other problems arise such as the difficulty in carrying and handling the pieces because of their heavy weight. Other problem posed is their fragility.

The object of this invention patent application succeeds in solving all these problems or inconveniences thanks to the light weight of the pieces forming the manhole, as well as their strength and durability.

In one aspect, the invention provides a process for making an underground manhole comprising excavating a hole at a desired location, with the hole having a surrounding surface. A first moulded member is placed in the hole, and has a pair of walls substantially perpendicular to each other. The walls of the first moulded member have an upper portion, an intermediate portion and a lower portion, the intermediate portion being tapered outwardly from the upper portion to the lower portion. A second moulded member is also provided having substantially identical construction to the first moulded member. The first and second moulded members are connected to each other to define a chamber. Connection is effected by connection means located on edges of the walls on the first and second moulded members. Thereafter, the space between the first and second moulded members and the surrounding surfaces of the hole is filled in.

In another aspect, the invention provides apparatus for constructing an underground manhole. The apparatus includes a first moulded member having first and second walls substantially perpendicular to each other. The first moulded member has an upper portion, an intermediate portion and a lower portion, with the intermediate portion tapered outwardly from the upper portion to the lower portion. A second moulded member having first and second walls substantially perpendicular to each other is also provided. The second moulded member has walls having an upper portion, an intermediate portion and a lower portion, with the intermediate portion being tapered outwardly from the upper portion to the lower portion. Fixing means is provided on the first and second walls of the first and second moulded members respectively. The fixing means permit the first wall of the first moulded member to be sealingly fixed to the second wall of the second moulded member, and the second wall of the first moulded member to be sealingly fixed to the first wall of the second moulded member.

In order to accomplish such characteristics, an appropriate raw material will be selected, which will be based on reinforced plastic compounds such glass-fibre reinforced polyester resins which show a high stability to degradation in addition to high mechanical characteristics.

However, in accordance with the proposed procedure, the raw material to be used makes no difference and in each case, the material offering the best characteristics will be selected, this being either of the type described above or based on PVC plastic derivatives.

The material known as S.M.C. (Vitropreg) will be preferably used since it offers electric current insulating and self-extinguishing properties, as well as those characteristics associated with polyester-fibre compounds.

The manhole is made by putting together two identical pieces which offer a square cross-section and a longitudinal profile in accordance with the contour the manhole will have, but always showing an upper staggering neck or mouth where a closing cover will be inserted and seated. In addition, both pieces forming the mould through which the manhole will be made, will also be provided with vertical and horizontal reinforcement ribs as well as holes intended for the passage of the relevant ducts.

The advantages derived from the manhole made in accordance with the object of the invention are the following:

1. The shaft or hole required for laying the manhole is smaller with this involving a smaller excavation volume and therefore a saving in excavation and earth transportation.

2. The execution time is very short and no qualified personnel is required. The operation is carried out by only one man since each piece only weighs 11 kg.

3. There is no dependence on components and materials (mortar, bricks, etc.), but only the module itself.

4. The certainty that all the manholes will be identical so that the standards prescribed by the various utilities can be readily complied with.

5. The price of those manholes carried out by using this system will involve cost savings of 50% in respect of the price of present manholes.

6. The manholes will be fully watertight, thus preventing the entry of underground water and moisture.

7. The manholes will not be electric current conducting, thus preventing earth leakage currents and possible accidents.

8. The cover supporting frame and the rest of the manhole remain unchanged by weather agents so that rusting becomes impossible.

In order to facilitate a better understanding of the invent characteristics, a detailed description is given below which is based on a set of drawings attached to this description as forming part of the same and where the following is stated solely for guidance and not for a restraining purpose:

Figures 1A, 1B:
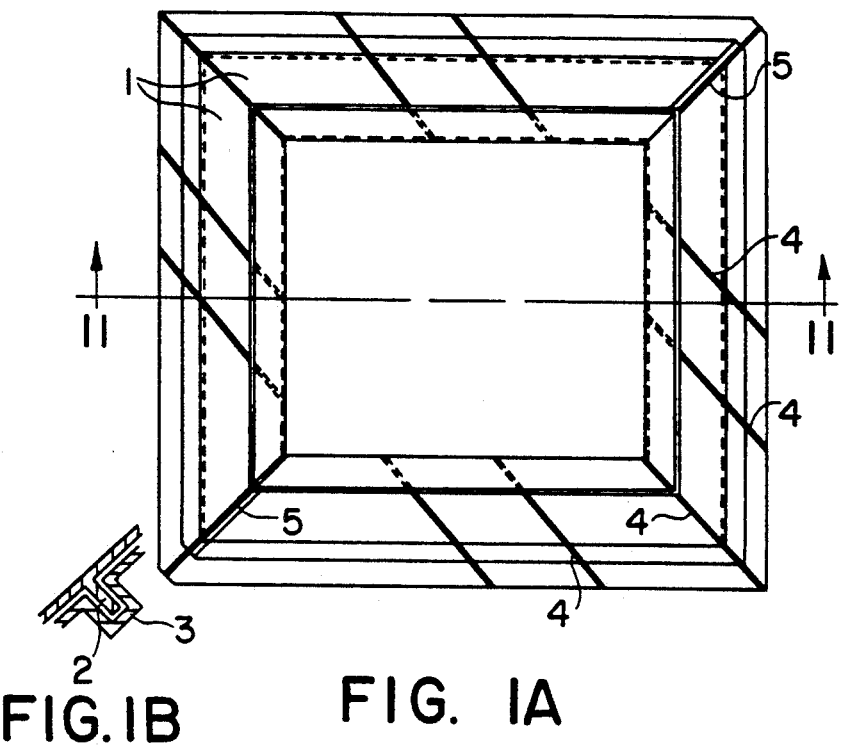
FIG. 1A shows a plan view of the module for carrying out the manhole according to the object of the invention.
FIG. 1B shows a detail of a fitting between two pieces of the invention.
Figure 2:
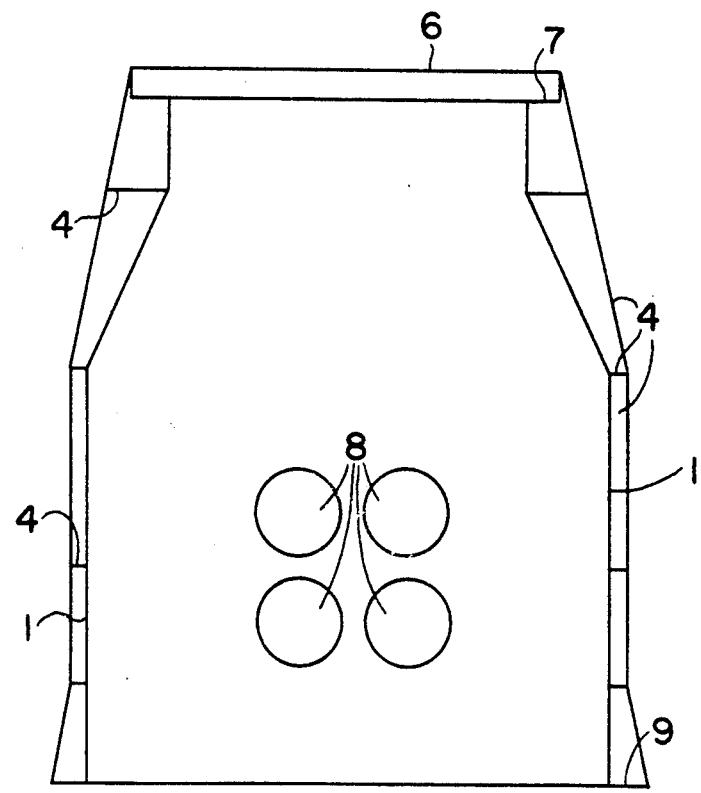
FIG. 2 shows a cross-sectional drawing on the plane corresponding to cutting line II—II in FIG. 1.
Figure 5:
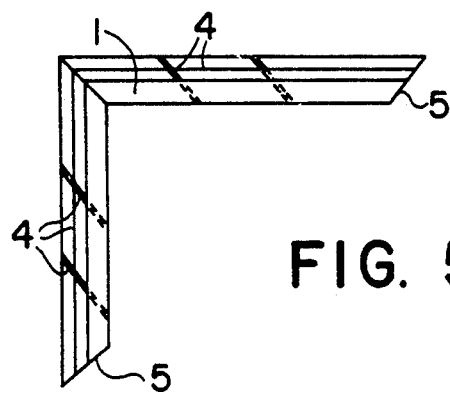
FIG. 5 shows a plan view of the two pieces through which the module shown in FIGS. 1 and 2 is obtained.

From figures mentioned above, it can be seen that the mould shown in FIGS. 1 and 2 is achieved by fitting together two identical pieces one of which is shown in FIG. 5 and referred to as (1). This fitting is carried out as a result of one of both pieces (1) having a channel (2) while the other piece is provided with a rib (3) where such channel fits and this is provided for on the fitting edge or borders (5) since both pieces (1) have a square profile, as can be seen in FIG. 5.

Such pieces are provided with both longitudinal and transverse reinforcement ribs (4) having different widths. The profile of such pieces is such that when joined together, they form a quadrangular hollow body which is narrowed toward the top where the mouth (6) takes form with a staggering profile intended for support and fit of the corresponding cover.

The module thus formed will be provided with holes (8) on its walls which are intended for the passage of ducts. It will be laid on a ditch or shaft carried out on the ground (9) and provided with a base (10) having an external wing intended to counteract the punching action on the ground. The openings (8) do not go through, that is they are just indicated and the wall is weakened in this area to facilitate the opening of the holes when required and in the number desired or to be used, with the remaining openings being left completely watertight.

Figure 3:
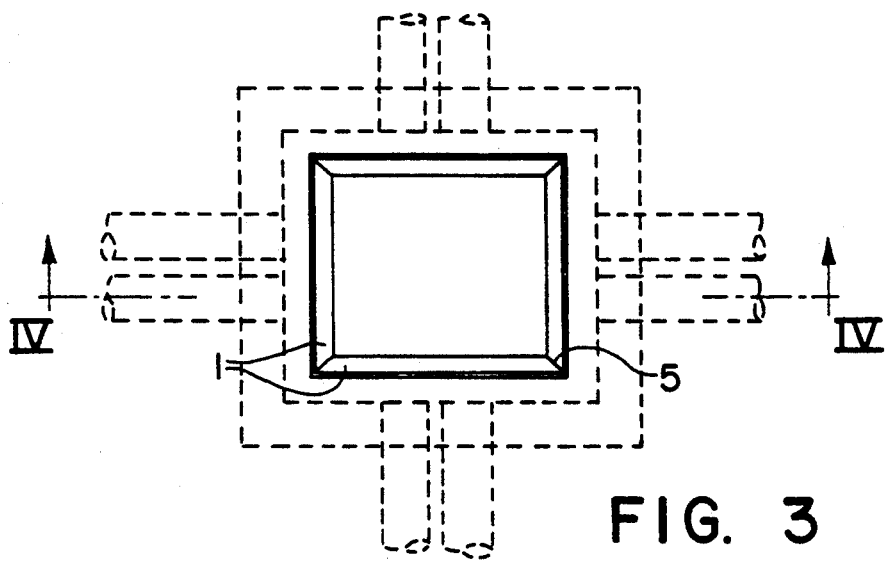
FIG. 3 shows a plan view of a manhole carried out according to the object of the invention.
Figure 4:
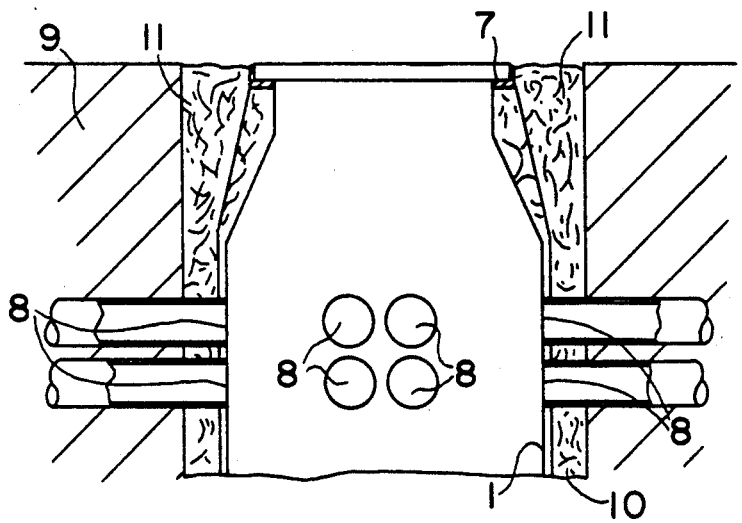
FIG. 4 shows a cross-sectional drawing on the plane corresponding to cutting line IV—IV in FIG. 3.

Once the module described above is lodged in the shaft or ditch, it is externally filled up with concrete (11), thus forming the manhole as can be seen in FIGS. 3 and 4.

I claim:

1. A process for making an underground manhole comprising:

excavating a hole at a desired location, the hole having a surrounding surface;

providing a first molded member in the hole, the first molded member having a pair of walls substantially perpendicular to each other, the walls of the first molded member having an upper portion, an intermediate portion and a lower portion, the intermediate portion being tapered outwardly from the upper portion to the lower portion;

providing a second molded member, having walls substantially identical in construction to the walls of the first molded member, in the hole;

connecting the first and second molded members to each other to define a chamber by connection means located on edges of the walls on the first and second molded members; and filling in a space between the first and second molded members and the surrounding surface of the hole.

2. A process as claimed in claim 1, further comprising connecting lines to the first or second molded members.

3. A process as claimed in claim 1, wherein the space is filled in with concrete.

4. A process as claimed in claim 1, wherein the space is filled in with earth.

5. A process as claimed in claim 1, wherein the space is filled with a mixture of both concrete and earth.

6. A process as claimed in claim 1, comprising providing molded members made of resistant lightweight material.

7. A process as claimed in claim 1, comprising providing molded members made of polyester fiber.

8. A process as claimed in claim 1, comprising providing molded members comprised of plastics materials.

9. A process as claimed in claim 1, further comprising the step of locating a cover over the molded members.

10. A process as claimed in claim 1, further comprising the steps of providing an area of weakness on the molding member to facilitate punching out of such area of weakness to provide access holes in the molding member for receiving a duct.

11. A process as claimed in claim 1, further comprising the step of providing reinforcement ribs on the molded members.

12. Apparatus for constructing an underground manhole comprising:

a first molded member having first and second walls substantially perpendicular to each other, the first molded member having an upper portion, an intermediate portion, and a lower portion, wherein the intermediate portion is tapered outwardly from the upper portion to the lower portion;

a second molded member having first and second walls substantially perpendicular to each other, the second molded member having an upper portion, an intermediate portion and a lower portion, the intermediate portion being tapered outwardly from the upper portion to the lower portion; and fixing means on the first and second walls of the first and second molded members respectively, said fixing means permitting the first wall of the first molded member to be sealingly fixed to the second wall of the second molded member and the second wall of the first molded member to be sealingly fixed to the first wall of the second molded member.

13. Apparatus as claimed in claim 12, wherein the first and second molded members are substantially L-shaped.

14. Apparatus as claimed in claim 12, wherein the first and second walls of the first and second molded members include reinforcement ribs.

15. Apparatus as claimed in claim 12, wherein the first and second walls of the first and second molded members incorporate an area of weakness to facilitate the removal of such areas, thereby providing apertures in the wall for receiving a duct.

16. Apparatus as claimed in claim 12, wherein the first and second molded members are comprised of resistant lightweight material.

17. Apparatus as claimed in claim 12, wherein the molded members are comprised of a plastic material.

18. Apparatus as claimed in claim 12, wherein the molded members are comprised of polyester fiber.

19. Apparatus as claimed in claim 12, further comprising a cover member for the first and second molded members, when fixed to each other.

20. Apparatus as claimed in claim 12, wherein the fixing means comprises a projecting flange on the first wall of the first and second molded member respectively, and a receiving channel on the second wall of the first and second molded member respectively, the projecting flange running along the entire length of the wall and being received within the chamber, which runs along the entire length of the second wall.

* * * * *